(12) United States Patent
Ravizza et al.

(10) Patent No.: US 11,403,328 B2
(45) Date of Patent: Aug. 2, 2022

(54) LINKING AND PROCESSING DIFFERENT KNOWLEDGE GRAPHS

(71) Applicant: International Business Machines Corporation, Armonk, NY (US)

(72) Inventors: Stefan Ravizza, Wallisellen (CH); Frederik Frank Flöther, Schlieren (CH); Florian Graf, Zurich (CH); Erik Rueger, Ockenheim (DE); Andrea Giovannini, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 16/296,313

(22) Filed: Mar. 8, 2019

(65) Prior Publication Data

US 2020/0285657 A1    Sep. 10, 2020

(51) Int. Cl.
*G06F 16/28* (2019.01)
*G06F 16/901* (2019.01)

(52) U.S. Cl.
CPC .......... *G06F 16/288* (2019.01); *G06F 16/285* (2019.01); *G06F 16/9024* (2019.01)

(58) Field of Classification Search
CPC .. G06F 16/288; G06F 16/9024; G06F 16/258; G06F 16/285
See application file for complete search history.

(56) References Cited

U.S. PATENT DOCUMENTS

| | | | |
|---|---|---|---|
| 8,407,253 B2 | 3/2013 | Ryu et al. | |
| 9,178,933 B1 | 11/2015 | Soland | |
| 9,471,695 B1 | 10/2016 | Gallup et al. | |
| 9,547,823 B2 | 1/2017 | Hu et al. | |
| 9,652,659 B2 | 5/2017 | Kang et al. | |

(Continued)

FOREIGN PATENT DOCUMENTS

| | | |
|---|---|---|
| CN | 105912656 A | 8/2016 |
| CN | 106156365 A | 11/2016 |

(Continued)

OTHER PUBLICATIONS

Lonij et al., "Extending Knowledge Bases Using Images", 31st Conference on Neural Information Processing Systems (NIPS 2017), 6 pages.

(Continued)

*Primary Examiner* — Hosain T Alam
*Assistant Examiner* — Anthony G Gemignani
(74) *Attorney, Agent, or Firm* — Daniel M. Yeates (57) ABSTRACT

A method for linking a first knowledge graph (KG) and a second KG in the presence of a third KG is provided. Content of nodes of the first KG is compared to nodes of the second KG. If a first KG node has a content relationship to a related second KG node, an edge identified by a tuple identifying the first KG and the first KG node and a tuple identifying the second KG and the second KG node is stored in a meta-layer KG. The method comprises comparing content of the nodes from the third KG with the content of nodes from the first and second KG, and in case relationships are identified, more complex tuples establishing this relationship in the meta-layer are stored. Finally, the method also comprises storing at least all nodes and edges of the meta-layer knowledge graph.

18 Claims, 7 Drawing Sheets

(56) References Cited

U.S. PATENT DOCUMENTS

| | | | |
|---|---|---|---|
| 9,792,530 B1 | 10/2017 | Wu et al. | |
| 2013/0054708 A1* | 2/2013 | Bhatt | G06Q 10/107 709/206 |
| 2014/0122217 A1* | 5/2014 | Hills | G06Q 30/0239 705/14.39 |
| 2014/0122473 A1* | 5/2014 | Fletcher | G06Q 50/01 707/732 |
| 2014/0337306 A1 | 11/2014 | Gramatica | |
| 2015/0066944 A1* | 3/2015 | Majidian | G06N 5/048 707/741 |
| 2015/0127632 A1 | 5/2015 | Khaitan et al. | |
| 2015/0347591 A1* | 12/2015 | Bax | G06Q 30/0269 707/749 |
| 2016/0055409 A1 | 2/2016 | Majumdar et al. | |
| 2016/0203137 A1 | 7/2016 | Sabah et al. | |
| 2017/0193393 A1 | 7/2017 | Contractor et al. | |
| 2017/0221240 A1* | 8/2017 | Stetson | G06F 16/904 |
| 2018/0052855 A1 | 2/2018 | Sabah et al. | |
| 2018/0247214 A1* | 8/2018 | Ganjoo | G06Q 50/01 |
| 2018/0285700 A1* | 10/2018 | Stoop | G06N 20/00 |
| 2018/0357330 A1* | 12/2018 | Rodriguez | G06F 16/90335 |

FOREIGN PATENT DOCUMENTS

| | | |
|---|---|---|
| CN | 106355627 A | 1/2017 |
| GB | 2545309 A | 6/2017 |
| WO | 2012178092 A1 | 12/2012 |
| WO | 2014070138 A2 | 5/2014 |
| WO | 2016118286 A1 | 7/2016 |

OTHER PUBLICATIONS

Marino et al., "The More You Know: Using Knowledge Graphs for Image Classification", Cornell University, Submitted on Dec. 14, 2016, last revised Apr. 22, 2017, 9 pages.

Marino, K., "Data Analysis Project: Using Knowledge Graphs for Image Classification", Carnegie Mellon University, Mar. 27, 2018, 12 pages.

International Search Report and Written Opinion, International App. No. PCT/EP2020/054383, 10 pages.

* cited by examiner

LINKING AND PROCESSING DIFFERENT KNOWLEDGE GRAPHS

BACKGROUND

The invention relates generally to a method for combining knowledge graphs, and more specifically, to a computer-implemented method for linking a first knowledge graph and a second knowledge graph in a presence of a third knowledge graph. The invention relates further to a related system for linking a first knowledge graph and a second knowledge graph, and a related computer program product.

Artificial intelligence (AI), machine learning (ML), and similar technologies are in high demand in enterprise computing environments. Currently, a large quantity of enterprise applications are enhanced, either at their analytical capabilities or their user interfaces, by AI supported systems. Likewise, search engines and related systems rely heavily on techniques used in the field of AI. One of these techniques is the use of knowledge graphs. Knowledge graphs are used to store and process information. A knowledge graph comprises facts (collected from various sources) which are stored in the vertices (also known as "nodes") connected via a mash of edges (also known as "links") storing the relationship between the nodes.

Typical knowledge graphs can range from about 1 million to over 100 million vertices. Storing and managing knowledge graphs may require a substantial amount of storage, typically provided by high-performance servers and storage systems.

During the learning phase and during normal operation, nodes are consistently added and edges are created between the nodes so that the knowledge graph is continually extended.

Currently, it is known how to incorporate one or more secondary knowledge graphs into a primary knowledge graph or linking them as equal partners. However, access rights and other metadata of merged knowledge graphs are not always managed consistently or are missing completely.

There are several disclosures relating to knowledge graph management.

U.S. Pat. No. 9,792,530 discloses how a knowledge base is generated and used to classify images. The knowledge base includes a number of subcategories of a specified category. Instead of obtaining images just based on a category name, structured and unstructured data sources are used to identify subcategories of the category.

U.S. Patent Application Publication 2018/0052855 discloses techniques for learning latent interests based on metadata of one or more images. An analysis tool evaluates metadata associated with each digital multimedia object against a knowledge graph, where the knowledge graph is built from data including information external to each of the digital multimedia objects, and where the knowledge graph provides a plurality of attributes.

SUMMARY

According to one aspect of the present invention, a computer-implemented method for linking a first knowledge graph and a second knowledge graph in the presence of a third knowledge graph may be provided. The knowledge graphs may each comprise nodes connected by edges. The method may comprise comparing content of nodes of the first knowledge graph with content of nodes of the second knowledge graph, and, if a node of the first knowledge graph, the node having a first node ID, has a content relationship to a related node of a second knowledge graph, having a second node ID, storing an edge identified by the tuple comprising the first node ID and an ID of the first knowledge graph and a tuple comprising the second node ID and an ID of the second knowledge graph in a meta-layer knowledge graph.

The method may further comprise comparing content of the nodes of the third knowledge graph with (a) the content of nodes of the first knowledge graph and (b) content of the nodes of the second knowledge graph. Upon determining that a third node, having a third node ID, in the first knowledge graph relates to a fourth node, having a fourth node ID, in the third knowledge graph, and that a fifth node, having a fifth node ID, in the second knowledge graph has a content relationship to a sixth node, having a sixth node ID, in the presence of a content relationship between the fourth node and the sixth node in the third knowledge graph, storing an edge identifiable by the tuple comprising the first node ID and the ID of the first knowledge graph and a tuple comprising the fifth node ID and the ID of the second knowledge graph in the meta-layer knowledge graph.

Last but not least, the method may also comprise storing at least all nodes and edges of the meta-layer knowledge graph.

According to another aspect of the present invention, a system for linking a first knowledge graph and a second knowledge graph in the presence of a third knowledge graph in a third data structure in a third memory unit may be provided. Also, here, the knowledge graphs may each comprise nodes connected by edges. The system may comprise a comparison unit adapted for comparing content of nodes of the first knowledge graph with content of nodes of the second knowledge graph.

Additionally, the system may comprise a storage unit adapted for storing if a node of the first knowledge graph, the node having a first node ID, has a content relationship to a related node of a second knowledge graph, the related node, having a second node ID, exists, an edge identified by the tuple comprising the first node ID and an ID of the first knowledge graph and a tuple comprising the second node ID and an ID of the second knowledge graph in a meta-layer knowledge graph in a meta-layer data in a meta-layer memory unit.

Thereby, the comparison unit may also be adapted for comparing content of the nodes of the third knowledge graph with (a) the content of nodes of the first knowledge graph and (b) content of the nodes of the second knowledge graph.

Furthermore, the system may comprise a determination and storage module adapted for, upon determining, by the determination and storage module, that a third node, having a third node ID, in the first knowledge graph relates to a fourth node, having a fourth node ID, in the third knowledge graph, and that a fifth node, having a fifth node ID, in the second knowledge graph has a content relationship to a sixth node, having a sixth node ID, in the presence of a content relationship between the fourth node and the sixth node in the third knowledge graph, storing an edge identifiable by the tuple comprising the first node ID and the ID of the first knowledge graph and a tuple comprising the fifth node ID, and the ID of the second knowledge graph in the meta-layer knowledge graph. The determination and storage module may also be adapted for storing at least all nodes and edges of the meta-layer knowledge graph.

The proposed computer-implemented method for linking a first knowledge graph and a second knowledge graph may offer multiple advantages and technical effects.

With the meta-layer knowledge graph not becoming an integral part of any of the first and/or second knowledge graphs, the first and the second knowledge graph remain completely independent from each other. Each of the two knowledge graphs may be managed completely autonomously and may be owned by different constituents (e.g., legal entities). From a perspective of one of the two knowledge graphs, the second knowledge graph may be in a read only mode. Thus, this second knowledge graph may not be changed in terms of additional nodes or changes to edges by the owner of the first knowledge graph. Thus, users of the linked knowledge graph according to the proposed idea may mainly access the meta-layer instead of directly accessing a second knowledge graph. The meta-layer may also be adapted to manage access rights for a given user.

Furthermore, if an owner of a knowledge graph wants to sell insights enabled by accessing his knowledge graph, it would still be possible with the interlinked knowledge graphs. The meta-layer would only allow the traversal of the additional knowledge graph paying a fee if the user is enabled and the entry nodes of the knowledge graph with fees would not be visible.

However, users of both knowledge graphs may benefit from also accessing the knowledge graph of the other party. Thus, more relationships and more facts and content in nodes may be visible and accessible to a larger number of users.

In the simpler cases, it may only be required to add identifiers of the knowledge graphs to the node IDs of the link to nodes in the meta-layer. Additionally, complex, indirect relationships reflecting information available in a third knowledge graph may be addressed while leaving the original first and second knowledge graph independent. As sources for information expressing additional and higher-level relationships any kind of information source may be used: a third knowledge graph, a dictionary, a repository, a simple list of related terms, and so on. Basically, every information source showing relationships between content items may be used as a catalytic tool to link the first and the second knowledge graph. It may also be noted that this third source of information may not become an integral direct component of the meta-layer or any of the first and the second knowledge graph. Thus, third-party knowledge and relationship sources may remain completely unchanged. The same may apply to the original first and second knowledge graph. The complete interlinking information between the first and the second knowledge graph may be maintained in the meta-layer.

By the option to perform the interlinking method on a regular or dynamic schedule, it may be ensured that users of those constituents may always have access to the latest cross-reference information across the first and the second knowledge graph.

The proposed concept has also been developed to minimize the computational effort needed to perform graph operations. Indeed, by leaving the knowledge graphs separated instead of merging the knowledge graphs into one macro entity, the number of operations needed to perform knowledge graph traversal is reduced. For example, assume there are three knowledge graphs with number of nodes N1, N2, N3, respectively. If those graphs would be merged together, the number of nodes worked become $N=N1+N2+N3-N_{interlinks}$. As it is well known, graph traversal has the order $O(N)$, wherein N is the number of nodes in the graph, so that every traversal operation in the merged graph would be $O(N1+N2+N3-N_{interlinks})$.

With the here proposed approach of using interlinking edges—i.e., interlinks—the majority of knowledge cooperation would avoid a traversal of at least one knowledge graph. Thereby, it may be assumed (i) that in the traversal of a starting knowledge graph 1, interlinking with the knowledge graph 2 is found; via the interlinking one arrives at the corresponding node in knowledge graph 2; by traversing knowledge graph 2 one may arrive at the searched result.

Therefore, the order of these operations is $O(N1+N_{interlinks}+N2)$. Thereby, $N3 \gg N_{interlinks}$, by which the computational effort may be reduced significantly. It may also be noted that the more knowledge graphs are interconnected, the more this approach is computationally advantageous because only the relevant knowledge graphs are going to be traversed as opposed to all the nodes in a classical approach.

In the following, additional embodiments of the inventive concept—applicable to the method as well as to the system—will be described.

According to one permissive embodiment of the method, the third knowledge graph may be empty. Thus, it does not exist. In this case, the simple integration via the metadata layer would not be used. The case of the simple identity of the content of a node in the first knowledge graph and the content of the node and the second knowledge graph would not exist, and only the more complex relationship between the two knowledge graphs—and potentially a third one—would be applicable to the here proposed concept.

According to one advantageous embodiment of the method, the content relationship between the fourth node and the sixth node in the third knowledge graph may be a direct edge; in particular, an edge linking the fourth node and the sixth node—i.e., the two nodes comprised in the third knowledge graph. Alternatively, the fourth node and the sixth node in the third knowledge graph may be linked indirectly, i.e., via one or more other intermediate nodes. However, this may weaken the content relationship between the fourth node and the sixth node. Such an embodiment may be used, for instance, when the weights between the fourth node and the sixth node and the one or more intermediate nodes may be comparably high if compared to other surrounding edges in the third knowledge graph.

According to one advantageous embodiment of the method, the content relationship between the fourth node and the sixth node in the third knowledge graph is represented by an edge between the fourth node and at least one linking node of the third knowledge graph and an edge between the linking node and the sixth node.

According to one embodiment of the method, nodes of different knowledge graphs having a content relationship may comprise identical content. This option may represent the simplest case of a relationship. More complex relationships may be represented by synonyms, depending terms, or indirect descriptions.

According to some embodiments of the method, nodes of different knowledge graphs having a content relationship may be those which content relationship is determined using fuzzy equality, i.e., the content may be similar. This may be expressed by the words or sets of words having an edge distance smaller than a relative threshold, e.g., 80% of the words are enclosed in an embedded space, e.g., trained with an available corpus of text. Numerals known similarity algorithms, supporting repositories or text corpuses may be used.

As a consequence, and according to another optional embodiment of the method, nodes of different knowledge graphs having a content relationship are those for which the content of the related nodes are synonyms. Generally, such synonymity may be defined by a third and also a fourth knowledge graph, being instrumental and functioning as a catalyst for linking the first and the second knowledge graph.

According to some embodiments of the method, the first knowledge graph may be managed by a first knowledge graph management tool and the second knowledge graph may be managed by a second knowledge graph management tool. The two independent knowledge graph management tools as well as the content ownership of the first and the second knowledge graph may belong to different constituents, e.g., different legal entities. In such a case, the first knowledge graph may only be changed by users of the first legal entity (a first company) and the second knowledge graph may only be changed by users of the second legal entity (a second company). Thus, responsibilities for the different knowledge graphs may remain clearly defined.

According to some embodiments of the method, the second knowledge graph may be accessible in a read-only mode by the first knowledge graph management tool. Hence, the proposed quasi-integration—before also denoted as "linking"—may be performed using an administrative tool solely controlled by the first knowledge graph management tool owner. Consequently, no negative influence from the first constituent to the knowledge graph owned by the second constituent may be expected.

According to some embodiments, the method may be executed in or after regular time intervals. Thus, the linking between the first and the second knowledge graph may be kept current. The time intervals may have a predefined length or, the length of the time intervals may be determined dynamically, e.g., based on a parameter expressing a change rate in the first and/or second knowledge graph. The same principle may also be applied to the third knowledge graph. This may also be expressed as follows: according to a further embodiment, the method may be executed on time intervals determined based on a change index which may be a function of a number of changes in at least one of the first knowledge graph, the second knowledge graph and/or the third knowledge graph.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

According to a further aspect of the present invention, a computer-implemented method (CIM), computer program product (CPP) and/or computer system performs the following operations (not necessarily in the following order): (a) receiving a plurality of object recognition graph data sets respectively representing a plurality of object recognition graphs including a first graph and a second graph, with each object recognition graph of the plurality of object recognition graphs including: (i) a plurality of object type nodes that respectively represent a type or category of physical objects that may be recognized in image(s), and (ii) a plurality of edges respectively connecting object type nodes of the object recognition graph, with each edge representing a relationship between the pair of object type nodes connected by the edge; (b) determining that a first object type node of the first graph represents the same type or category of physical objects as a second object type node of the second graph; and (c) responsive to the determination that the first object type node of the first graph represents the same type or category of physical objects as a second object type node of the second graph, adding a first interlink to a metadata layer data set, with the first interlink indicating that the first object type node represents the same type or category of physical objects as the second object type node of the second graph.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Embodiments of the invention will be described, by way of example only, and with reference to the following drawings.

DETAILED DESCRIPTION

Some embodiments of the present invention may recognize one, or more, problems, shortcomings, opportunities for improvement and/or challenges with respect to the current state of the art: (i) there may be an additional need to overcome existing difficulties in combining two knowledge graphs in the presence of a third knowledge graph—representing a sort of ground truth; and/or (ii) there may be a need to overcome existing difficulties in maintaining access rights to nodes by different tenants of a knowledge graph environment (that is a system of computers and/or people who use knowledge graphs to perform useful tasks and/or acquire useful information).

In the context of this description, the following conventions, terms and/or expressions may be used.

The term 'knowledge graph' (may be abbreviated "KG") may denote a data structure—also implementable in hardware—comprising nodes having node identifiers (node IDs). The nodes may comprise content or facts and they may be linked by edges—also known as links—expressing relationships between the nodes. The nodes may also be denoted as vertices or vertexes. The edges may have related weighting factor values expressing a strength value of a relationship between the two different nodes. In the context of this document, independent knowledge graphs are referenced, e.g., a first knowledge graph, a second knowledge graph and at least one third knowledge graph.

The term 'in the presence' may denote that the subject matter in which presence something happens—e.g., a linking of the first and the second knowledge graph—may act as a sort of a catalyst or helping structure in order to facilitate a linking of the first and the second knowledge graph without being part of the final product, i.e., the linked knowledge graph.

The term 'third knowledge graph' may denote the so-called catalyst knowledge graph. This expression is used because the third knowledge graph may remain independent from the first and the second knowledge graph even after the first and the second knowledge graph are linked.

The term 'meta-layer knowledge graph'—or in short 'meta-layer'—may denote a knowledge graph that is independent from the first, the second and the third knowledge graph. The meta-layer knowledge graph may enable the linking of the first and the second knowledge graph. In embodiments where it is possible to link the first and second knowledge graph without the need for information available in the third knowledge graph only, the meta-layer only comprises edges linking nodes of the first knowledge graph to nodes of the second knowledge graph.

However, it may also be possible that nodes are comprised in the meta-layer. This may be useful for nodes of the third knowledge graph because using the information in the third knowledge graph—in form of nodes and related edges—may be instrumental for determining indirect links between nodes of the first knowledge graph and the second knowledge graph.

In some embodiments, the meta-layer knowledge graph exists independently—e.g., in a separate storage unit—from the first knowledge graph and the second knowledge graph. Thus, the different knowledge graphs may be managed and maintained on different hardware environments under different security mechanisms to facilitate complete separate ownership and management access rights to the first, the second and the third knowledge graph.

The term 'direct edge' may denote an edge directly connecting two related nodes. In contrast, an indirect relationship may be expressed by one or more intermediate nodes between the first node and the second node. A direct edge may be identified by a tuple of node IDs, each of the node IDs representing one of the linked nodes by the edge.

In the following, a detailed description of the figures will be given. All instructions in the figures are schematic. Firstly, a block diagram of an embodiment of the inventive computer-implemented method for linking a first knowledge graph and a second knowledge graph is given. Afterwards, further embodiments, as well as embodiments of the system for linking a first knowledge graph and a second knowledge graph will be described.

Figure 1:
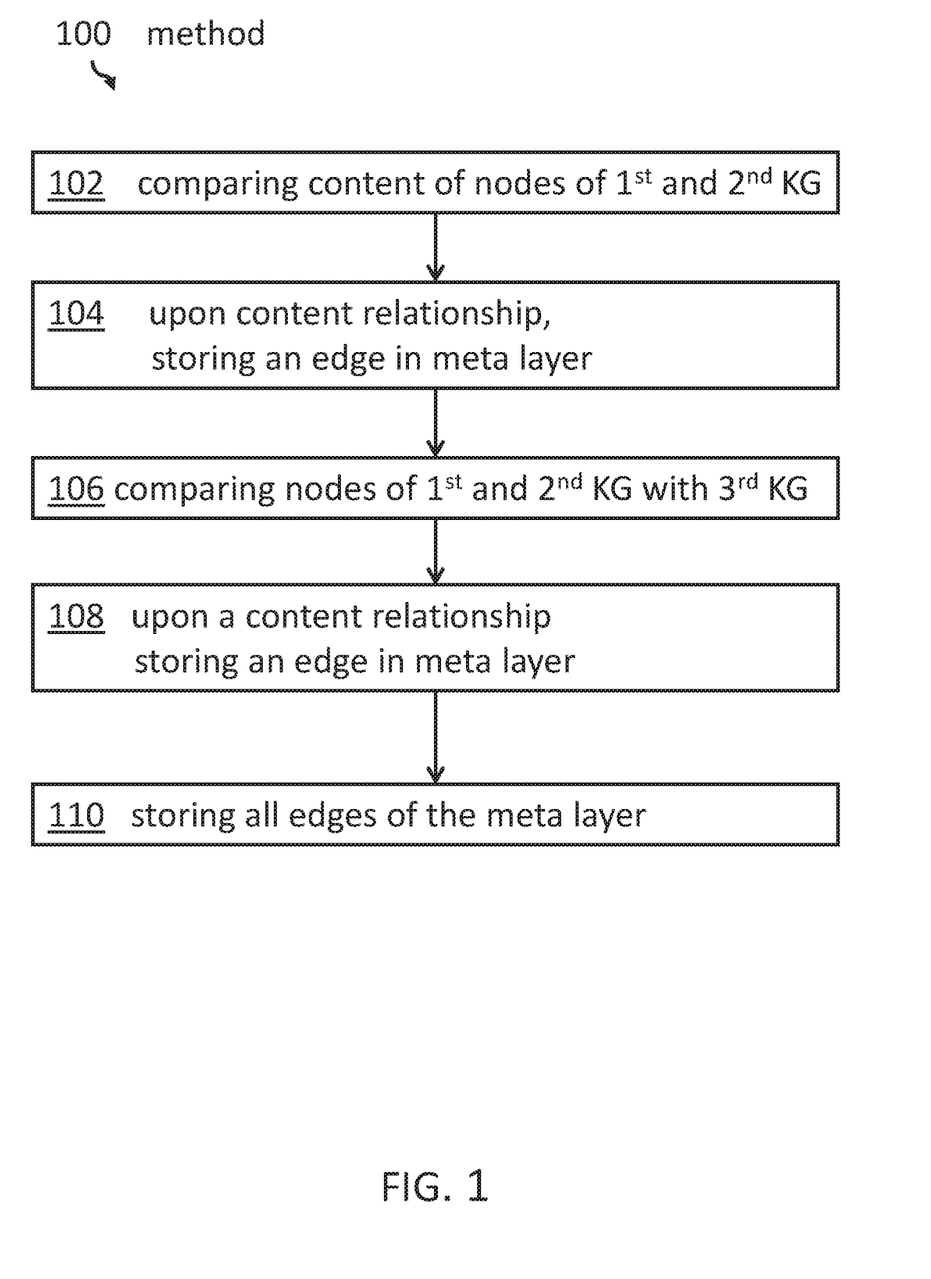
FIG. 1 shows a block diagram of an embodiment of the inventive computer-implemented method for linking a first knowledge graph and a second knowledge graph.

FIG. 1 shows a block diagram of an embodiment of the computer-implemented method 100 for linking a first knowledge graph and a second knowledge graph which may potentially be owned by different constituents—i.e., independent ownerships of the knowledge graph—in the presence of—i.e., catalyzed by—a third knowledge graph. The knowledge graphs each comprise nodes connected by edges. The method comprises comparing, 102, content of nodes from the first knowledge graph with content of nodes from the second knowledge graph.

Additionally, the method 100 comprises storing, 104, an edge identified by the tuple comprising a first node ID and an ID of the first knowledge graph, and a tuple comprising a second node ID and an ID of the second knowledge graph in a meta-layer knowledge graph, if the node of the first knowledge graph, the node having a first node ID, has a content relationship to a related node—in particular an identical content or a fuzzy similar content—of the second knowledge graph, the related node having the second node ID, exists.

The method 100 further comprises comparing, 106, content of the nodes of the third knowledge graph with (a) the content of nodes of the first knowledge graph and (b) content of the nodes of the second knowledge graph. Upon determining that a third node, having a third node ID, in the first knowledge graph relates to a fourth node, having a fourth node ID, in the third knowledge graph, and that a fifth node, having a fifth node ID, in the second knowledge graph has a content relationship to a sixth node, having a sixth node ID, in the presence of a content relationship—expressed by a direct edge or indirect via intermediate nodes—between the fourth node and the sixth node in the third knowledge graph, the method 100 comprises storing, 108, an edge identifiable by the tuple comprising the first node ID and the ID of the first knowledge graph and a tuple comprising the fifth node ID and the ID of the second knowledge graph in the meta-layer knowledge graph.

The method 100 also comprises storing, 110, at least all nodes and edges of the meta-layer knowledge graph.

Figure 2:
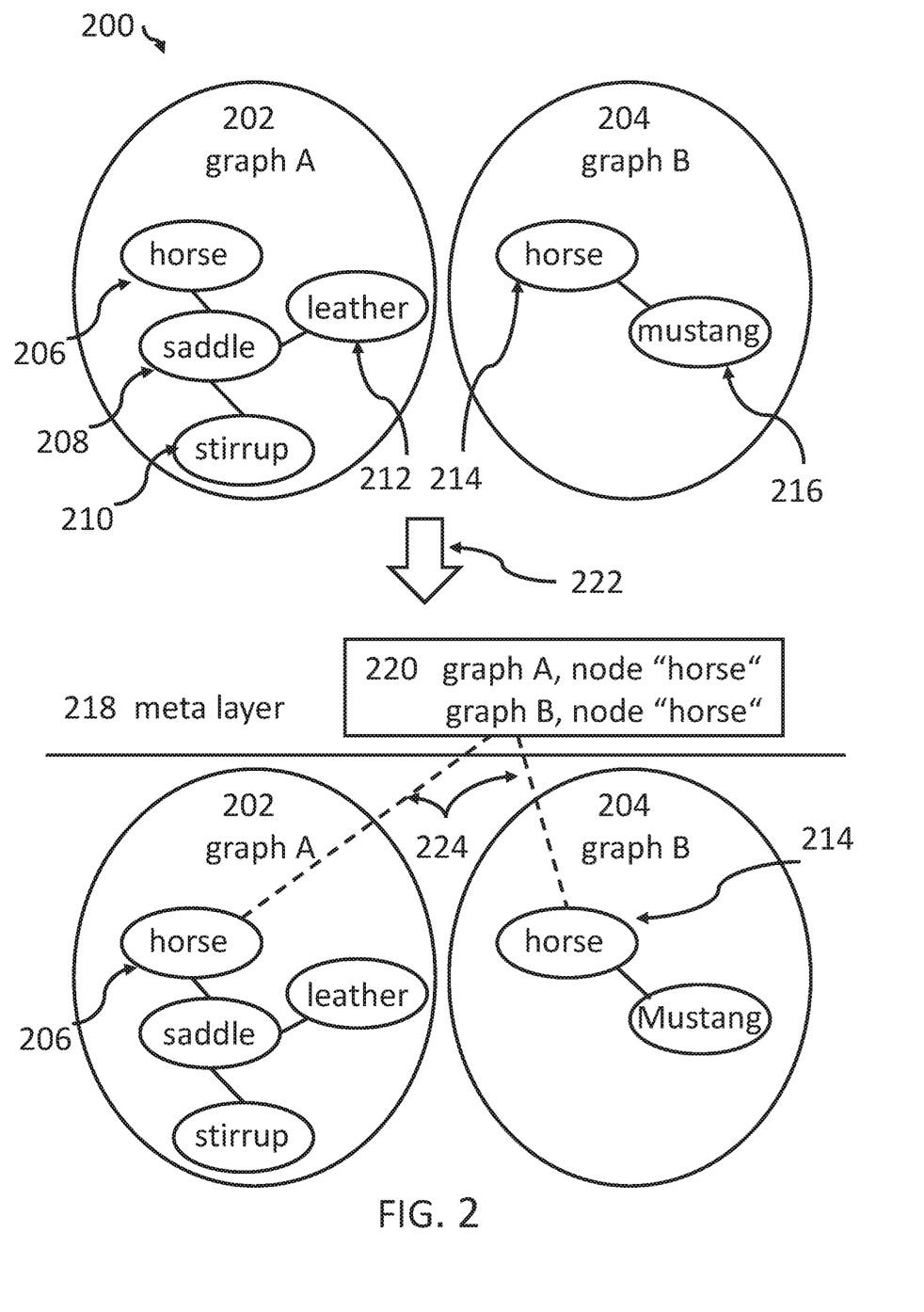
FIG. 2 shows a block diagram of an embodiment comprising two independent knowledge graphs and the linked knowledge graphs with a meta-layer.

FIG. 2 shows a block diagram 200 of an embodiment comprising two independent knowledge graphs 202, 204 and the linked knowledge graphs 202, 204 with a meta-layer 218.

The first knowledge graph A 202 comprises, for example, the four nodes "horse" 206 linked to "saddle" 208 linked to "leather" 212, and also linked to "stirrup" 210.

The second knowledge graph B 204 comprises, for example, the node "horse" 214 linked to the node "mustang" 216. The arrow 222 expresses the process of linking the two knowledge graphs 202, 204.

If it is determined that the content of the node 206 ("horse") of knowledge graph A 202 is identical to the node 214 of the knowledge graph B 204, a linkage can be established by defining a linking edge 220 in the meta-layer 218 defining the relationship—expressed by reference numeral 224—between the two mentioned nodes, and thus between the two knowledge graphs. It may be noted that the original knowledge graphs 202, 204 remain completely independent and may also be managed by independent knowledge graph management tools by different management authorities (constituents).

The linking edge 220 in the meta-layer 218 may be defined by a first tuple comprising an identifier for the first knowledge graph A 202 and a node ID of the node 206 on one side, and another tuple comprising an identifier of the second knowledge graph B 204 and a node ID of the node 214, on the other side.

Figure 3:
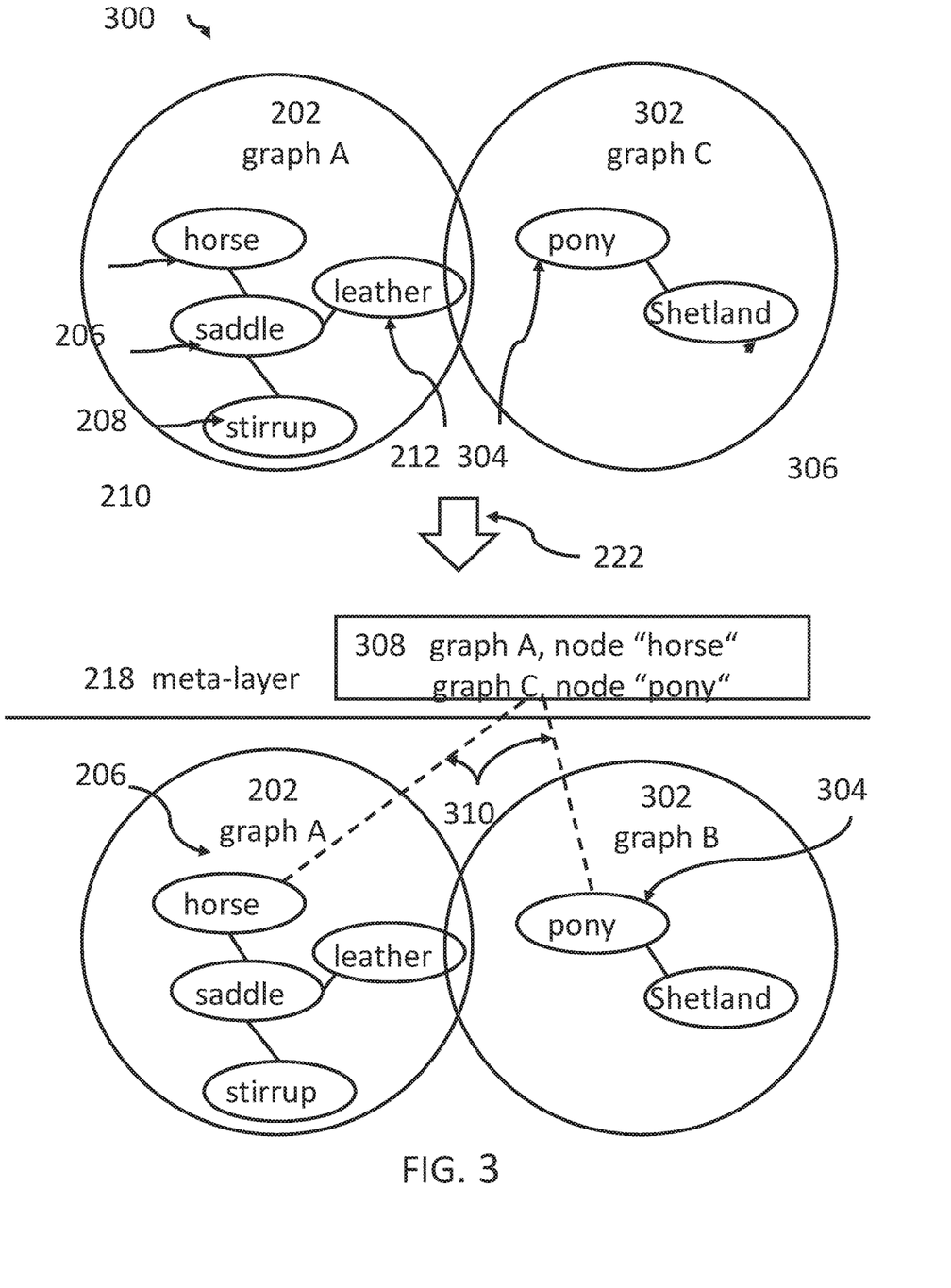
FIG. 3 shows a block diagram of an embodiment similar to the one of FIG. 2, with the difference that general knowledge is used.

FIG. 3 shows a block diagram of an embodiment 300 comprising a similar setup as in FIG. 2, with the difference that general knowledge is used. Instead of the second knowledge graph B 204, here, another second knowledge graph C 302 is used comprising the node 304 "pony" linked to node 306 "Shetland". To the human mind, it is obvious that the nodes "horse" and "pony" in the first knowledge graph A 202 and the second knowledge graph C 302 are linked, because a pony is also a horse. This relationship may be available in one of the two knowledge graphs 202 or 302 or may be made available to the method in an interactive step with a user input. Alternatively, the information about the relationship horse/pony may also be available from a repository, a dictionary or a list of tuples representing such or similar relationships.

The result of the linking process 222 is comparable to the result of FIG. 2. A linking edge 308 is built in the meta-layer 218, wherein the linking edge 308 (defining the relationship 310) is defined by the tuple comprising an identifier for the first knowledge graph 202 and a node ID for the node 206 and the tuple comprising an identifier for the second knowledge graph 302 and a node ID of the node 304. The remaining conditions—if compared to FIG. 2—remain unchanged.

Figure 4:
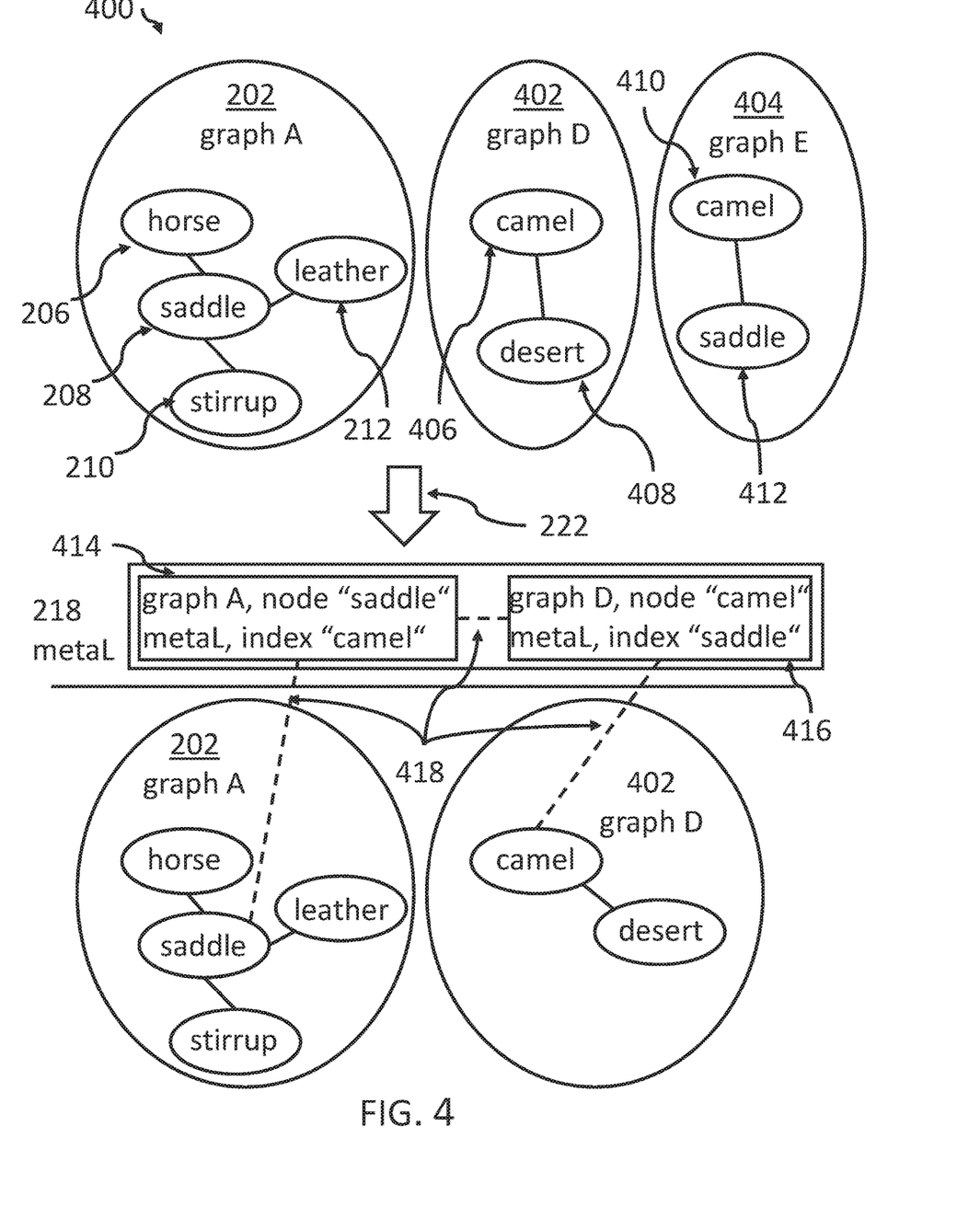
FIG. 4 shows a block diagram of an embodiment merging two knowledge graphs using a relationship of vertices of a third knowledge graph.

FIG. 4 shows a block diagram 400, an embodiment merging two knowledge graphs 202, 402 using a relationship of nodes of a third knowledge graph 404. The content of the first knowledge graph 202 is unchanged when compared to the previous examples.

The second knowledge graph D 402 now comprises the nodes 406 "camel" linked to the node 408 "desert". As shown, there is no directly visible and obvious relationship between nodes of the first knowledge graph A 202 and second knowledge graph D 402. However, this relationship information is delivered by the third knowledge graph E 404, comprising the nodes, 410 "camel" linking to node 412 "saddle". Thus, saddles may also be used for camels.

In this case, the meta-layer 218 comprises more complex data, namely: a tuple 414 comprising an identifier for the first knowledge graph A 202, a node ID for the node 208 "saddle" and an index pointing to the meta-layer expression "camel"; and second tuple 416 comprising an identifier for the second knowledge graph D 402, a node ID for the node 410 "camel" and an index pointing to the meta-layer expression "saddle". This more complex relationship is expressed by the dashed lines identified by the reference numeral 418. As in the examples before, the first knowledge graph 202 and the second knowledge graph 402 remain independent, and the linking information relates to the meta-layer 218.

Figure 5:
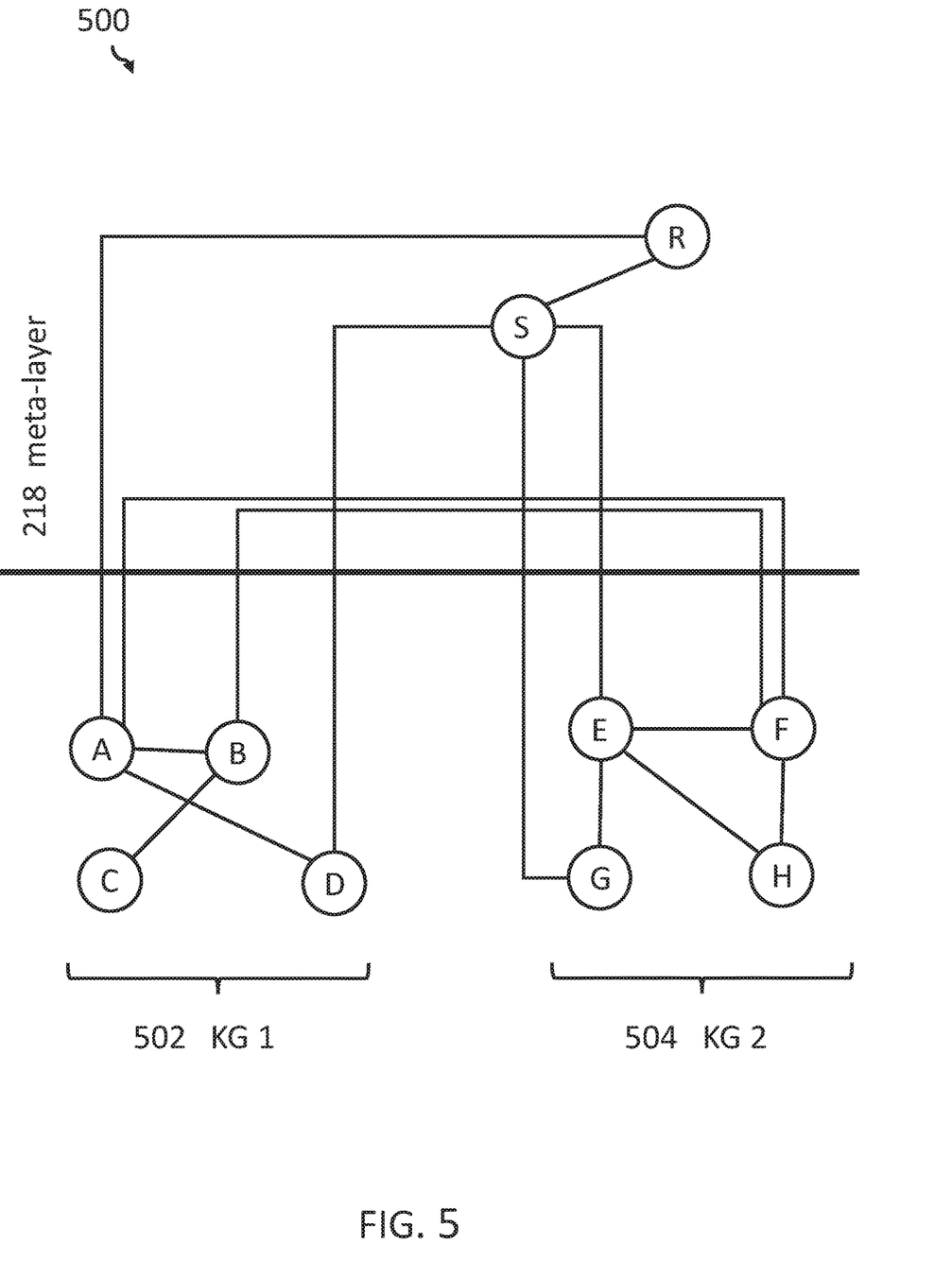
FIG. 5 shows a simplified block diagram for an embodiment including the first knowledge graph, a second knowledge graph and a third knowledge graph.

FIG. 5 shows a simplified block diagram 500 for an embodiment with a first knowledge graph, a second knowledge graph and a third knowledge graph. This extension of the proposed method makes use of external data as follows: when an interlinking edge is created, and other related concepts are found in the available data (e.g., interpreted images) which are not yet present in any of the knowledge graphs, then a node is added in the same meta-layer 218 that comprises information about the interlinking edge(s). In this case, the interlinking edge will then connect the two knowledge graphs not directly but through the meta-layer 218 node(s).

In addition, if relations between concepts—i.e., semantical relationships—are found in the data where none of the concepts are found in any of the knowledge graphs, but at least one of the concepts is found in the meta-layer 218, then the other concepts are connected in the meta-layer 218 through meta-layer edges. This approach leads to the advantage that during a search not only the interlinking edges between the knowledge graphs are used, but also the indirect connections stored in the meta-layer 218, which provide additional insights and can connect to additional knowledge graphs.

This concept is shown in FIG. 5, in which nodes S and R are found in a third source but are not contained in any of the existing knowledge graphs. Therefore, the nodes S and R are stored in the meta-layer 218 and in various embodiments of the present invention, automatic relations between the already existing nodes of the first knowledge graph 502 and the second knowledge graph 504 are made possible, e.g., A-R-S-G.

The content of FIG. 5 should be understandable by a person skilled in the art after having understood the preceding figures. There is a first knowledge graph 502 with the nodes A, B, C and D with the shown edges; and there is a second knowledge graph 504, comprising the nodes E, F, G and H with the shown edges. There are simple meta-layer 218 edges between the nodes A and F as well as B and F. The other indirect links from the first knowledge graph 502 to the second knowledge graph 504 are facilitated through the meta-layer nodes S and R, as shown. Determining the relationships between nodes of the active knowledge graphs 502 and 504 and the meta-layer 218 nodes—here, S and R—is performed according to the principles explained in the preceding figures, e.g., by the concept of identical content or the concept of fuzzy identity of node content.

In some embodiments, performing the method 100, in light of FIGS. 2-5, can transform the inputs into a new set of linking data. In some embodiments, the result of the transformation is meta-layer 218. In some embodiments the result of the transformation can be a linking edge. In some embodiments, the linking data can include nodes that interlink identical nodes from various knowledge graphs.

Figure 6:
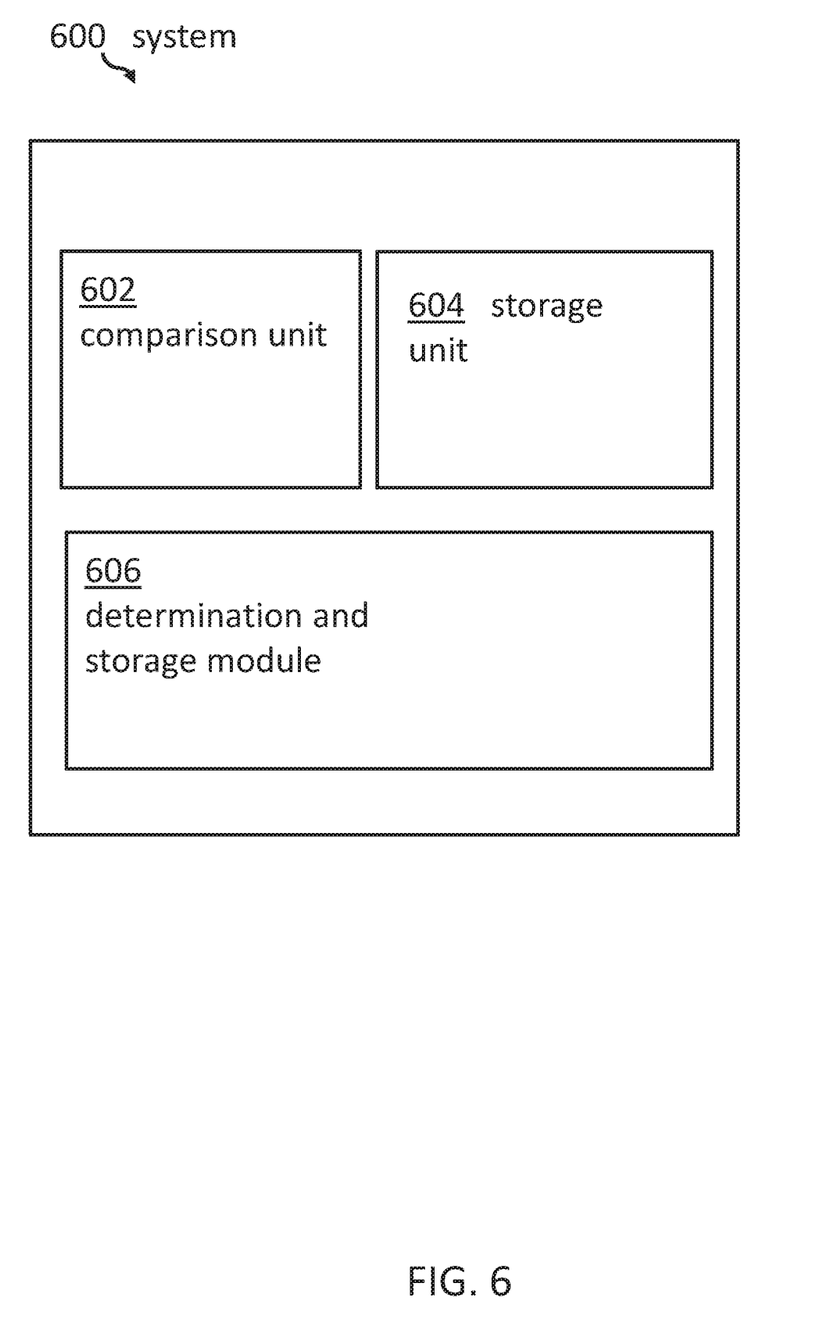
FIG. 6 shows a block diagram of an embodiment of a system for linking a first knowledge graph and a second knowledge graph.

FIG. 6 shows a block diagram of an embodiment of a knowledge graph linking system 600 for linking a first knowledge graph and a second knowledge graph. The first knowledge graph is maintained in a first data structure in a first memory unit (not shown), and the second knowledge graph is maintained in a second data structure in a second memory unit (not shown). The linking of the first and the second knowledge graph is facilitated in the presence of a third knowledge graph in a third data structure in a third memory unit (not shown). The knowledge graphs each comprise nodes connected by edges.

The system comprises a comparison unit 602 adapted for comparing content of nodes of the first knowledge graph with content of nodes of the second knowledge graph.

A storage unit 604 is adapted for storing, if a node of the first knowledge graph (compare 202, FIG. 2), the node (compare 206, FIG. 2) having a first node ID, has a content relationship to a related node (compare 214, FIG. 2) of a second knowledge graph (compare 204, FIG. 2), the related node having a second node ID, exists, an edge (compare 220, FIG. 2) identified by the tuple comprising the first node ID and an ID of the first knowledge graph and a tuple comprising the second node ID and an ID of the second knowledge graph in a meta-layer (compare 218, FIG. 2) knowledge graph in meta-layer data in a meta-layer memory unit (not shown).

The comparison unit 602 is also adapted for comparing content of the nodes of the third knowledge graph (compare 404, FIG. 4) with (a) the content of nodes of the first knowledge graph (compare 202, FIG. 4) and (b) content of the nodes of the second knowledge graph (compare 402, FIG. 4).

Furthermore, the system 600 comprises a determination and storage module 606 adapted to: upon determining that a third node (compare 208, FIG. 4), having a third node ID, in the first knowledge graph (compare 202, FIG. 4) relates to a fourth node (compare 412, FIG. 4), having a fourth node ID, in the third knowledge graph (compare 404, FIG. 4), and that a fifth node (compare 406, FIG. 4), having a fifth node ID, in the second knowledge graph (compare 402, FIG. 4) has a content relationship to a sixth node (compare 410, FIG. 4) having a sixth node ID, in the presence of a content relationship between the fourth node and the sixth node in the third knowledge graph (compare 402, FIG. 4), determination and storage module 606 is adapted for storing an edge identifiable by the tuple comprising the first node ID and the ID of the first knowledge graph and a tuple comprising the fifth node ID and the ID of the second knowledge graph in the meta-layer knowledge graph. Here, the first node can be linked to the fifth node based on the first node and the third node being linked in the first knowledge graph. In some embodiments, an edge can comprise any set of tuples that are linked, even if separated by several nodes (e.g. A.R.S.G of FIG. 5). In some embodiments, determination and storage module 606 is adapted for storing an edge identifiable by the tuple comprising the third node ID and the ID of the first knowledge graph and a tuple comprising the fifth node ID and the ID of the second knowledge graph in the meta-layer knowledge graph.

Additionally, the determination and storage module 606 is adapted for storing at least all nodes and edges of the meta-layer knowledge graph.

Figure 7:
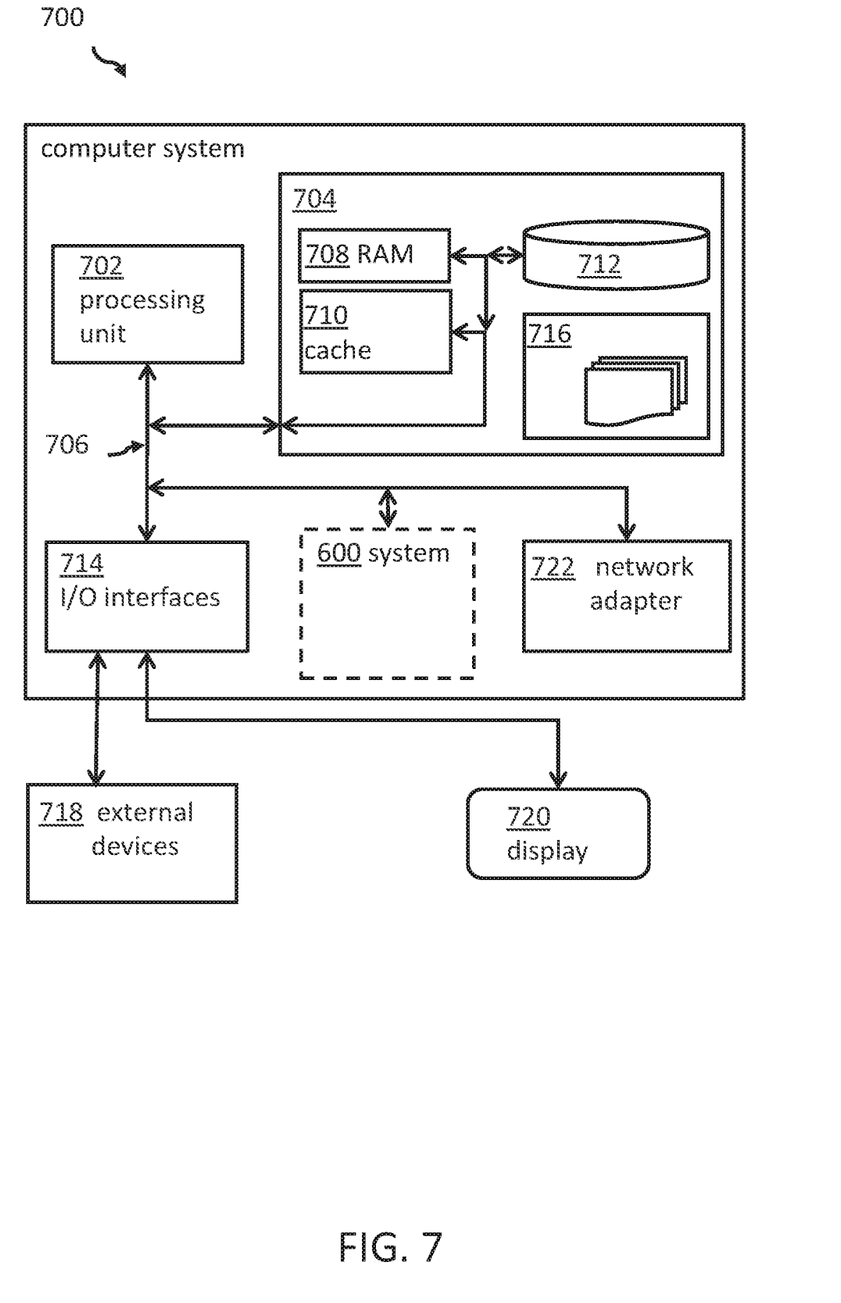
FIG. 7 shows an embodiment of a computing system comprising the system according to FIG. 6.

Embodiments of the invention may be implemented together with virtually any type of computer suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the invention described herein. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the disclosure.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

In some embodiments, computer system/server 700 can allow for the addition or installation of hardware and/or software components. In these embodiments, the additions allow the computing platform to be specialized in certain manners and to perform certain tasks, thus rendering the computing platform into a specialized machine.

Additionally, the system 600 for linking a first knowledge graph and a second knowledge graph may be attached to the bus system 706. Linking system 600 and computer system 700 can result in a specialized machine.

The descriptions of the various embodiments of the present invention have been presented for purposes of illustration and are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In summary, various embodiments have been discussed which are again specified in the following numbered clauses:

Clause 1 is as follows. A computer-implemented method for linking a first knowledge graph and a second knowledge graph, in a presence of a third knowledge graph, the knowledge graphs comprising each nodes connected by edges, the method comprising: comparing content of nodes from the first knowledge graph with content of nodes from the second knowledge graph; storing, if a node of the first knowledge graph, the node having a first node ID, has a content relationship to a related node of a second knowledge graph, the related node having a second node ID, exists, an edge identified by the tuple comprising the first node ID and an ID of the first knowledge graph and a tuple comprising the second node ID and an ID of the second knowledge graph in a meta-layer knowledge graph; comparing content of the nodes from the third knowledge graph with (a) the content of nodes from the first knowledge graph and (b) content of the nodes from the second knowledge graph; upon determining that a third node, having a third node ID, in the first knowledge graph relates to a fourth node, having a fourth node ID, in the third knowledge graph, and that a fifth node, having a fifth node ID, in the second knowledge graph has a content relationship to a sixth node, having a sixth node ID, in the presence of a content relationship between the fourth node and the sixth node in the third knowledge graph, storing an edge identifiable by the tuple comprising the first node ID and the ID of the first knowledge graph and a tuple comprising the fifth node ID and the ID of the second knowledge graph in the meta-layer knowledge graph; and storing at least all nodes and edges of the meta-layer knowledge graph.

Clause 2 is as follows. The method of clause 1, wherein the third knowledge graph is empty.

Clause 3 is as follows. The method of clause 1 or 2, wherein the content relationship between the fourth node and the sixth node in the third knowledge graph is a direct edge.

Clause 4 is as follows. The method of any of the preceding clauses, wherein the content relationship between the fourth node and the sixth node in the third knowledge graph is represented by an edge between the fourth node at least one linking node of the third knowledge graph, and an edge between the linking node and the sixth node.

Clause 5 is as follows. The method of any of the preceding clauses, wherein nodes of different knowledge graphs, having a content relationship, comprise identical content.

Clause 6 is as follows. The method of any of the preceding clauses, wherein nodes of different knowledge graphs, having a content relationship, are those which content relationship is determined using fuzzy equality.

Clause 7 is as follows. The method of any of the preceding clauses, wherein nodes of different knowledge graphs, having a content relationship, are those for which the content of the related nodes are synonyms.

Clause 8 is as follows. The method of any of the preceding clauses, wherein the first knowledge graph is managed by a first knowledge graph management tool and the second knowledge graph is managed by a second knowledge graph management tool.

Clause 9 is as follows. The method of clause 8, wherein the second knowledge graph is accessible in a read-only mode by the first knowledge graph management tool.

Clause 10 is as follows. The method of any of the preceding clauses, wherein the method is executed in regular time intervals.

Clause 11 is as follows. The method of any of the preceding clauses, wherein the method is executed in intervals determined based on a change index which is a function of a number of changes in at least one of the first knowledge graph, the second knowledge graph and/or the third knowledge graph.

Clause 12 is as follows. A knowledge graph linking system for linking a first knowledge graph in a first data structure in a first memory unit and a second knowledge graph in a second data structure in a second memory unit, in a presence of a third knowledge graph in a third data structure in a third memory unit, the knowledge graphs each comprising nodes connected by edges, the system comprising: a comparison unit adapted for comparing content from nodes from the knowledge graph with content of nodes from the second knowledge graph; a storage unit adapted for storing if a node of the first knowledge graph, the node having a first node ID, has a content relationship to a related node of a second knowledge graph, the related node, having a second node ID, exists, an edge identified by the tuple comprising the first node ID and an ID of the first knowledge graph and a tuple comprising the second node ID and an ID of the second knowledge graph in a meta-layer knowledge graph in a meta-layer data in a meta-layer memory unit; wherein the comparison unit is also adapted for comparing content of the nodes from the third knowledge graph with (a) the content from nodes of the first knowledge graph and (b) content of the nodes from the second knowledge graph; upon determining, by a determination and storage module, that a third node, having a third node ID, in the first knowledge graph relates to a fourth node, having a fourth node ID, in the third knowledge graph, and that a fifth node, having a fifth node ID, in the second knowledge graph, has a content relationship to a sixth node having a sixth node ID, in the presence of a content relationship between the fourth node and the sixth node in the third knowledge graph; storing an edge identifiable by the tuple comprising the first node ID and the ID of the first knowledge graph and a tuple comprising the fifth node ID and the ID of the second knowledge graph in the meta-layer knowledge graph; and storing at least all nodes and edges of the meta-layer knowledge graph.

Clause 13 is as follows. The system according to clause 12, wherein the third knowledge graph is empty.

Clause 14 is as follows. The system according to clause 12 or 13, wherein the content relationship between the fourth node and the sixth node in the third knowledge graph is a direct edge.

Clause 15 is as follows. The system according to any of the clauses 12 to 14, wherein the content relationship between the fourth node and the sixth node in the third knowledge graph is represented by an edge between the fourth node at least one linking node of the third knowledge graph and an edge between the linking node and the sixth node.

Clause 16 is as follows. The system according to any of the clauses 12 to 15, wherein nodes of different knowledge graphs, having a content relationship, comprise identical content.

Clause 17 is as follows. The system according to any of the clauses 12 to 16, wherein nodes of different knowledge graphs, having a content relationship, are those which content relationship is determined using fuzzy equality.

Clause 18 is as follows. The system according to any of the clauses 12 to 17, wherein nodes of different knowledge graphs, having a content relationship are those for which the content of the related nodes are synonyms.

Clause 19 is as follows. The system according to any of the clauses 12 to 18, wherein the first knowledge graph is managed by a first knowledge graph management tool and the second knowledge graph is managed by a second knowledge graph management tool.

Clause 20 is as follows. The system according to clause 19, wherein the second knowledge graph is accessible in a read-only mode by the first knowledge graph management tool.

Clause 21 is as follows. The system according to any of the clauses 12 to 20, wherein the method is executed after regular time intervals.

Clause 22 is as follows. The system according to any of the clauses 12 to 21, wherein the method is executed based on a change index which is a function of a number of changes in at least one of either the first knowledge graph, the second knowledge graph and/or the third knowledge graph.

Clause 23 is as follows. A computer program product for linking a first knowledge graph in a first data structure in a first memory unit and a second knowledge graph in a second data structure in a second memory unit, in a presence of a third knowledge graph in a third data structure in a third memory unit, the knowledge graphs comprising each nodes connected by edges, the computer program product comprising a computer readable storage medium having program instructions embodied therewith, the program instructions being executable by one or more computing systems or controllers to cause the one or more computing system to: compare content of nodes from the first knowledge graph with content from nodes from the second knowledge graph; store, if a node of the first knowledge graph, the node having a first node ID, has a content relationship to a related node of a second knowledge graph, the related node having a second node ID, exists, an edge identified by the tuple comprising the first node ID and an ID of the first knowledge graph and a tuple comprising the second node ID and an ID of the second knowledge graph in a meta-layer knowledge graph; compare content of the nodes from the third knowledge graph with (a) the content of nodes from the first knowledge graph and (b) content of the nodes from the second knowledge graph; upon determining that a third node, having a third node ID, in the first knowledge graph relates to a fourth node, having a fourth node ID, in the third knowledge graph, and that a fifth node, having a fifth node ID, in the second knowledge graph has a content relationship to a sixth node having a sixth node ID, in the presence of a content relationship between the fourth node and the sixth node in the third knowledge graph, store an edge identifiable by the tuple comprising the first node ID and the ID of the first knowledge graph and a tuple comprising the fifth node ID and the ID of the second knowledge graph in the meta-layer knowledge graph; and store at least all nodes and edges of the meta-layer knowledge graph.

What is claimed is:

1. A computer-implemented method for linking a first knowledge graph and a second knowledge graph, in a presence of a third knowledge graph, the knowledge graphs each comprising nodes connected by edges, the method comprising:
  comparing content of nodes from a first knowledge graph with content of nodes from a second knowledge graph;
  storing, in response to a first node of the first knowledge graph, the first node having a first node ID, having a first content relationship to a second node of the second knowledge graph, the second node having a second node ID, a first edge in a meta-layer knowledge graph wherein the first edge is identified by a first tuple, the first tuple comprising the first node ID and an ID of the first knowledge graph, and a second tuple, the second tuple comprising the second node ID and an ID of the second knowledge graph;
  comparing content of the nodes from the third knowledge graph with the content of nodes from the first knowledge graph and the content of the nodes from the second knowledge graph;
  determining that a third node, having a third node ID, in the first knowledge graph relates to a fourth node, having a fourth node ID, in the third knowledge graph, and that a fifth node, having a fifth node ID, in the second knowledge graph has a content relationship to a sixth node in the third knowledge graph, wherein the sixth node has a second content relationship with the fourth node; and storing, in response to the determining, a second edge identifiable by a third tuple comprising the third node ID and the ID of the first knowledge graph and a fourth tuple, the fourth tuple comprising the fifth node ID and the ID of the second knowledge graph in the meta-layer knowledge graph, wherein a search traverses from the first knowledge graph to the second knowledge graph via the meta layer knowledge graph and the meta layer knowledge graph does not include information from the third knowledge graph.

2. The method of claim 1, wherein the second content relationship includes a direct edge.

3. The method of claim 1, wherein the second content relationship represented by an edge between the fourth node and at least one linking node of the third knowledge graph, and an edge between the linking node and the sixth node.

4. The method of claim 1, wherein the first content relationship is based on the first node and the second node contains identical content.

5. The method of claim 1, wherein the first content relationship is determined using fuzzy equality.

6. The method of claim 1, wherein the first content relationship is based on the first node and the second node including synonyms.

7. The method of claim 1, wherein the first knowledge graph is managed by a first knowledge graph management tool and the second knowledge graph is managed by a second knowledge graph management tool.

8. The method of claim 7, wherein the second knowledge graph is accessible in a read-only mode by the first knowledge graph management tool.

9. The method of claim 1, wherein the method is executed in regular time intervals.

10. The method of claim 9, wherein the method is executed in intervals determined based on a change index which is a function of a number of changes in at least one of the first knowledge graph, the second knowledge graph and the third knowledge graph.

11. A system comprising:
a comparison unit, wherein the comparison unit is adapted for comparing content from nodes from a first knowledge graph with content of nodes from a second knowledge graph, and for comparing content of nodes from a third knowledge graph with the content from nodes of the first knowledge graph and content of the nodes from the second knowledge graph, wherein the first knowledge graph includes a first knowledge graph ID, the second knowledge graph includes a second knowledge graph ID, and the third knowledge graph includes a third knowledge graph ID;
a storage unit, wherein the storage unit is adapted for storing one or more edges in a meta-layer knowledge graph in a meta-layer data in a meta-layer memory unit;
a processor;
a computer-readable storage medium communicatively coupled to the processor and storing program instructions which, when executed by the processor, are configured to cause the processor to perform a method, the method comprising:
storing, in response to a first node of the first knowledge graph having a first content relationship to a second node of the second knowledge graph, a first edge of the one or more edges in the meta-layer knowledge graph, wherein the first edge is identified by a first tuple and a second tuple, the first tuple comprising the first node ID and the first knowledge graph ID, and the second tuple comprising the second node ID and the second knowledge graph ID;
determining, by a determination and storage module, a third node in the first knowledge graph relates to a fourth node in the third knowledge graph, and that a fifth node in the second knowledge graph has a second content relationship to a sixth node in the third knowledge graph in the presence of a third content relationship between the fourth node and the sixth node in the third knowledge graph; and
storing, in response to the determining, a second edge of the one or more edges, the second edge comprising a third tuple and a fourth tuple, the third tuple comprising a third node ID for the third node and the first knowledge graph ID and, the fourth tuple comprising a fifth node ID for the fifth node and the second knowledge graph ID, wherein a search traverses from the first knowledge graph to the second knowledge graph via the meta layer knowledge graph and the meta layer knowledge graph does not include information from the third knowledge graph.

12. The system of claim 11, wherein the second content relationship includes a direct edge.

13. The system of claim 11, wherein the second content relationship is represented by an edge between the fourth node and at least one linking node of the third knowledge graph and an edge between the linking node and the sixth node.

14. The system of claim 11, wherein the first content relationship is based on the first node and the second node containing identical content.

15. A computer-implemented method (CIM) comprising:
receiving a plurality of object recognition graph data sets respectively representing a plurality of object recognition graphs including a first graph, a second graph, and a third graph, with each object recognition graph of the plurality of object recognition graphs including a plurality of object type nodes that respectively represent a type or category of physical objects that may be recognized in image(s), and a plurality of edges respectively connecting object type nodes of the object recognition graph, with each edge representing a relationship between the pair of object type nodes connected by the edge;
determining that a first object type node of the first graph represents the same type or category of physical objects as a second object type node of the second graph; and
responsive to the determination that the first object type node of the first graph represents the same type or category of physical objects as a second object type node of the second graph, adding a first interlink to a metadata layer data set, with the first interlink indicating that the first object type node represents the same type or category of physical objects as the second object type node of the second graph, wherein a search can traverse from the first graph to the second graph via the meta layer data set and the meta layer data set does not include information from the third graph.

16. The CIM of claim 15 further comprising:
assembling a meta object recognition graph data set representing a meta object recognition graph including: the pluralities of object type nodes from each object recognition graph of the plurality of object recognition graphs, the pluralities of edges from each object recognition graph of the plurality of object recognition graphs, and a plurality of interlinks included in the metadata layer data set, with each interlink of the plurality of interlinks connecting a pair of object type nodes respectively from two different object recognition graphs of the plurality of object recognition graphs.

17. The CIM of claim 15 further comprising:

receiving a first plurality of images from a first social media site;

performing image recognition on the first plurality of images to obtain a first plurality object types and categories included in the first plurality of images;

defining the plurality of object type nodes of the first graph based upon the first plurality of object types and categories;

receiving a second plurality of images from a second social media site;

performing image recognition on the second plurality of images to obtain a second plurality object types and categories included in the second plurality of images; and defining the plurality of object type nodes of the second graph based upon the second plurality of object types and categories.

18. The CIM of claim 17 wherein:

the first plurality of images includes still images and video images; and the second plurality of images includes still images and video images.

* * * * *